(12) United States Patent
Lee et al.

(10) Patent No.: US 8,766,979 B2
(45) Date of Patent: Jul. 1, 2014

(54) THREE DIMENSIONAL DATA COMPRESSION

(75) Inventors: Ken Lee, Fairfax, VA (US); Xin Hou, Falls Church, VA (US)

(73) Assignee: VanGogh Imaging, Inc., McLean, VA (US)

( * ) Notice: Subject to any disclaimer, the term of this patent is extended or adjusted under 35 U.S.C. 154(b) by 366 days.

(21) Appl. No.: 13/355,364

(22) Filed: Jan. 20, 2012

(65) Prior Publication Data
US 2013/0187915 A1    Jul. 25, 2013

(51) Int. Cl.
*G06T 15/30*    (2011.01)

(52) U.S. Cl.
USPC .......................................... 345/423; 345/420

(58) Field of Classification Search
CPC ....................................................... G06T 17/20
USPC ................................................. 345/420, 423
See application file for complete search history.

(56) References Cited

U.S. PATENT DOCUMENTS

| | | | |
|---|---|---|---|
| 6,525,722 B1 | 2/2003 | Deering |
| 6,525,725 B1 | 2/2003 | Deering |
| 7,248,257 B2 | 7/2007 | Elber |
| 2005/0253924 A1 | 11/2005 | Mashitani |

OTHER PUBLICATIONS

Melax, S., "A Simple, Fast, and Effective Polygon Reduction Algorithm," Game Developer, Nov. 1998, pp. 44-49.
Rossignac, J. et al. "3D Compression Made Simple: Edgebreaker on a Corner-Table," Invited lecture at the Shape Modeling International Conference, Gemoa, Italy (Jan. 30, 2001), pp. 1-6.

*Primary Examiner* — Maurice L McDowell, Jr.
(74) *Attorney, Agent, or Firm* — Proskauer Rose LLP

(57) ABSTRACT

Described are computer-based methods and apparatuses, including computer program products, for compressing three dimensional data of a scene. Data is received comprising (i) three dimensional data of a scene, and (ii) depth data associated with the three dimensional data. A triangle mesh is generated based on the three dimensional data, the triangle mesh comprising a plurality of triangles, each triangle including three vertices and three edges connecting the three vertices. For each edge in the triangle mesh, a metric is calculated for the edge based on data from the depth data associated with the edge, a length of the edge, and a curvature of the edge. A set of edges is collapsed based on a metric associated with each edge in the set of edges to generate a compressed triangle mesh.

13 Claims, 6 Drawing Sheets

| Vertex 402 | Collapsing Candidate 404 | Metric Value 406 |
|---|---|---|
| V8 | Null | 132.7 |
| V5 | V8 | 121.4 |
| V0 | V8 | 110.3 |
| V2 | V5 | 105.5 |
| V4 | V0 | 98.2 |
| V7 | V2 | 87.0 |
| V1 | V7 | 75.8 |
| V3 | V8 | 60.4 |
| V6 | V1 | 56.1 |

FIG. 4

THREE DIMENSIONAL DATA COMPRESSION

TECHNICAL FIELD

The technical field relates generally to computer-based methods and apparatuses, including computer program products, for three dimensional data compression, and in particular to triangle mesh compression.

BACKGROUND

Three dimensional (3D) imaging is a technique of creating the illusion of depth in an image so that the depth is perceived by a viewer. As 3D applications become more widespread, accurate 3D data compression is becoming more and more important. For example, considerations for 3D applications include not only the speed of rendering, but also the speed of 3D data processing (e.g., such as registration and merging), and the size of memories to save the 3D files.

Triangle mesh compression is a type of data compression that often involves reducing the number of triangles in the mesh while attempting to preserve the overall shape, volume, and boundaries of the mesh. There are a number of different approaches to triangle mesh compression. A first example, often referred to as coplanar facets merging, searches the facets (or triangle planes in the mesh) to identify facets that are coplanar or nearly coplanar. The identified facets are merged into large polygons to simplify the overall mesh.

A second example, often referred to as controlled vertex/edge/facet decimation, iteratively eliminates components (e.g., such as vertices, edges and facets) in the mesh. Components are often selected for elimination based on local optimization criteria (e.g., criteria that only preserves the shape (such as high curvature parts) of 3D data without considering other things, such as the distance and angle relative to the viewer or 3D camera) that will preserve the overall shape of mesh.

A third example, often referred to as vertex clustering, groups vertices of the triangle mesh into clusters, and computes a new representative vertex for each cluster. A fourth example, often referred to as a wavelet-based approach, usually includes a three phases process of re-meshing, re-sampling and wavelet parameterization, to build a multi-resolution representation of the surface. However most triangle mesh compression algorithms just consider the overall shape preservation of the meshes (e.g., regardless of the depth of the mesh).

SUMMARY OF THE INVENTION

Compression that incorporates the depth of the mesh can generate compressed 3D data with little, if any, impact on a user's experience. For example, human eyes are not extremely sensitive to the objects in a 3D scene that are far away from the viewer, or at the edge of vision of the viewer. Therefore, the meshes that are further away from the viewer or at the edge of the viewer's vision can be compressed more than other meshes in the scene with little, if any, notice to the viewer (e.g., such that the compressed meshes with texture, from the viewer's perspective, are nearly the same as the original meshes with texture).

In one aspect, there is a computerized method. The computerized method is for compressing three dimensional data of a scene. The computerized method includes receiving, by a computing device, data including (i) three dimensional data of a scene, and (ii) depth data associated with the three dimensional data. The computerized method includes generating, by the computing device, a triangle mesh based on the three dimensional data, the triangle mesh including a plurality of triangles, each triangle including three vertices and three edges connecting the three vertices. The computerized method includes calculating, by the computing device, for each edge in the triangle mesh, a metric for the edge based on data from the depth data associated with the edge, a length of the edge, and a curvature of the edge. The computerized method includes collapsing, by the computing device, a set of edges based on a metric associated with each edge in the set of edges to generate a compressed triangle mesh.

In another aspect, there is a computer program product. The computer program product is tangibly embodied in a non-transitory computer readable medium. The computer program product includes instructions being operable to cause a data processing apparatus to receive data including (i) three dimensional data of a scene, and (ii) depth data associated with the three dimensional data. The computer program product includes instructions being operable to cause a data processing apparatus to generate a triangle mesh based on the three dimensional data, the triangle mesh including a plurality of triangles, each triangle including three vertices and three edges connecting the three vertices. The computer program product includes instructions being operable to cause a data processing apparatus to calculate for each edge in the triangle mesh, a metric for the edge based on data from the depth data associated with the edge, a length of the edge, and a curvature of the edge. The computer program product includes instructions being operable to cause a data processing apparatus to collapse a set of edges based on a metric associated with each edge in the set of edges to generate a compressed triangle mesh.

In another aspect, there is a computing device. The computing device is for compressing three dimensional data of a scene. The computing device includes a receiving module configured to receive data including (i) three dimensional data of a scene, and (ii) depth data associated with the three dimensional data. The computing device includes a processing module in communication with the receiving module configured to generate a triangle mesh based on the three dimensional data, the triangle mesh including a plurality of triangles, each triangle including three vertices and three edges connecting the three vertices. The computing module is configured to calculate for each edge in the triangle mesh, a metric for the edge based on data from the depth data associated with the edge, a length of the edge, and a curvature of the edge. The computing module is configured to collapse a set of edges based on a metric associated with each edge in the set of edges to generate a compressed triangle mesh.

In another aspect, there is an apparatus. The apparatus is for compressing three dimensional data of a scene. The apparatus includes a means for receiving data including (i) three dimensional data of a scene, and (ii) depth data associated with the three dimensional data. The apparatus includes a means for (i) generating a triangle mesh based on the three dimensional data, the triangle mesh including a plurality of triangles, each triangle including three vertices and three edges connecting the three vertices, (ii) calculating for each edge in the triangle mesh, a metric for the edge based on data from the depth data associated with the edge, a length of the edge, and a curvature of the edge, and (iii) collapsing a set of edges based on a metric associated with each edge in the set of edges to generate a compressed triangle mesh.

In other examples, any of the aspects above can include one or more of the following features. In some examples, the received data includes (iii) texture data associated with the three dimensional data, the method further including generating compressed three dimensional data including the compressed triangle mesh and the texture data, wherein the texture data is not modified. Generating the triangle mesh can include generating the triangle mesh based on the depth data associated with the three dimensional data.

In other examples, collapsing an edge from the set of edges, the edge including a first vertex and a second vertex, includes moving the first vertex to a same location as a location of the second vertex, such that the edge is removed from the triangle mesh. A first set of edges can include the first vertex as an vertex, and collapsing can include adjusting the first set of edges to include the second vertex instead of the first vertex. Generating the triangle mesh can include generating the triangle mesh based on the three dimensional data such that objects in the three dimensional data are not distinguished among using separate triangle meshes.

In some examples, calculating a metric for an edge includes calculating a metric for a vertex based on: (i) a curvature metric calculated based on neighboring edges that include the vertex, (ii) a distance metric calculated based on a depth from the depth data associated with the vertex, and (iii) an angle metric calculated based on an angle between a normal of the vertex and a direction of a data capturing device that captured the data, wherein the normal is calculated by averaging a normal for each facet in a set of facets in the triangle mesh that contain the vertex.

In other examples, calculating, for each edge in the triangle mesh, a metric for the edge comprises calculating a metric for each vertex in the triangle mesh based on (i) data from the depth data associated with the vertex, (ii) a length of one or more edges that include the vertex as an end point, and (iii) a curvature of one or more edges of a line that include the vertex as an end point. The set of edges to collapse can be calculated based on: (i) a desired compression ratio, and (ii) a metric associated with each edge in the set of edges. The computing device can include a cell phone, a smart phone, a personal data assistant, a field-programmable gate array, or any combination thereof.

The techniques, which include both methods and apparatuses, described herein can provide one or more of the following advantages. The 3D data can be accurately compressed with little, if any, impact on the user's perception of the 3D scene. A cost of portions of a 3D model (e.g., a triangle mesh) can be calculated and used to compress certain portions of the 3D model. For example, the metric can be higher for closer objects in the 3D model (e.g., and therefore more likely to cause noticeable distortion to a viewer if collapsed) and lower for objects that are further away (e.g., and therefore less likely to cause noticeable distortion to a viewer if collapsed). Thus, portions with a lower metric can be compressed more than portions with a higher metric without drastically impacting a user's perception of the 3D scene.

The 3D model can be compressed to achieve a desired compression ratio. Additionally, new components (e.g., vertices, edges) are not added to the 3D model, so the relationship between the 3D data and other information (e.g., the texture data) is maintained. The compression can drastically reduce the size of 3D data files, and therefore the compressed 3D data can therefore be saved easier and/or transmitted easier, and devices can process the compressed 3D data easier than uncompressed 3D data (or data compressed using different computerized methods).

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other aspect, features, and advantages will be more fully understood from the following description of various embodiments, when read together with the accompanying drawings.

FIG. 4 is an exemplary table for generating compressed 3D data;

DETAILED DESCRIPTION

In general, computerized systems and computerized methods are provided for generating compressed 3D data. A triangle mesh can be compressed by taking into account information gleaned from the device that captured the 3D image data (e.g., a 3D scanner or viewer). For example, a metric (e.g., cost) of edges within a triangle mesh can be calculated for each edge based on curvature, length, and the location of the edge with respect to the data capturing device. A metric function can be used to calculate a metric value for each edge or vertex of the triangle mesh (e.g., which can be based on a distance from the viewing source, an angle from the viewing source, and/or a curvature of the component of the mesh under consideration). Based on the calculated metrics, edges can be eliminated in order to reach a desired compression ratio while preserving the shape of the triangle mesh as much as possible. For example, the metric value can be used to determine which portions of the triangle mesh are further away form a viewer (e.g., and therefore which portions can be compressed more than portions that are closer to the viewer because there is less risk of distorting the 3D image).

Such compression can result in better compression with minimal effect to the high definition texture of the image. The compressed 3D data can preserve the color texture of the original 3D data by preserving the relationship between the texture data (e.g., a JPEG image) and the geometric points (e.g., the 3D data).

Figure 1:
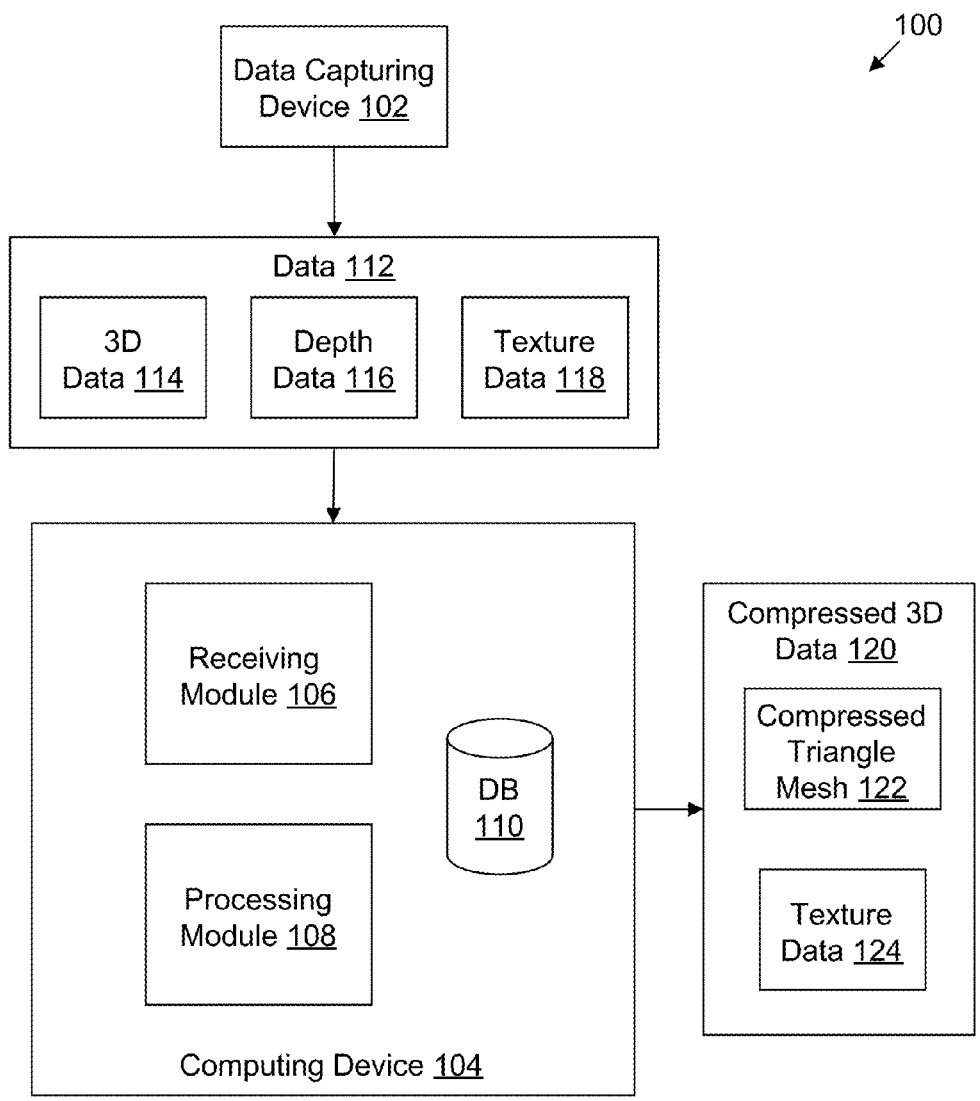
FIG. 1 is a diagram of an exemplary system for generating compressed 3D data.

FIG. 1 is a diagram of an exemplary system 100 for generating compressed 3D data. The system 100 includes a data capturing device 102 in communication with a computing device 104. The computing device 104 includes a receiving module 106, a processing module 108, and a database 110. The data capturing device 102 transmits data 112 to the computing device 104. The data 112 includes 3D data 114, depth data 116, and texture data 118. The computing device 104 generates compressed 3D data 120 based on the data 112. The compressed 3D data includes compressed triangle mesh 122 and texture data 124. While the data capturing device 102 and the computing device 104 are shown as separate devices in FIG. 1, in some embodiments the data capturing device 102 and the computing device 104 comprise a single device.

Data capturing device 102 can be any 3D data capturing device (e.g., including artificial 3D rendering devices that generate 3D data based on 2D images, such as stereo pair 2D images). In some examples, data capturing device 102 is a 3D scanner that analyzes a real-world scene (e.g., including one or more objects in an environment) to collect data on the scene shape and possibly its appearance (e.g., color, texture, etc.).

The data capturing device 102 generates data 112. The 3D data 114 is 3D data about the scene (e.g., X, Y and Z coordinates of an image, such as an OBJ file). The depth data 116 is data that indicates the location of the data capturing device 102 (e.g., from a viewer's perspective of the scene). Because the depth data 116 indicates the location of the data capturing device 102, the depth data 116 can be used to determine various properties of the data 112, such as the distances between the data capturing device 102 (a camera) and the 3D data 114 (e.g., vertices of the 3D data 114), relative angels between the data capturing device 102 direction and a vertex normals for the vertices. A vertex normal can be calculated for a vertex by averaging a line (e.g., a line of length 1) perpendicular to each facet that includes the vertex. The vertex normal can be used to determine whether a vertex is facing away from the data capturing device 102. If a vertex is facing towards the data capturing device, then the vertex is important; if facing away, then the vertex is not as important.

In some examples, the depth data 116 includes a depth map (e.g., a distance for each X, Y, Z point from the data capturing device 102—a distance from each point to the vertex of where the data capturing device 102 is located). For example, the angle and position of the data capturing device 102 can be extracted from a depth map by extrapolating the distance and angle relative to the captured scene (e.g., by working backward from an object in the scene). In some examples, the depth data 116 includes the angle and position of the data capturing device 102 (e.g., which is determined using a calibration process), and the angle and position are used to extract the depth map based on the location of the vertices in the 3D space (e.g., the vertices in the 3D data 114). Therefore, in some embodiments the data capturing device 102 generates the depth map, while in some embodiments the processing module 108 and/or the data capturing device 102 extracts the location and angle of the data capturing device 102 and uses the extracted information to generate the depth map.

The texture data 118 includes information about the texture of the scene. For example, the texture data 118 can be a high definition (HD) image of the scene (e.g., a JPEG file). While not shown, the 3D data 114 can include a mapping file that maps the 3D data 114 to the texture data 118 (e.g., an MPL file). For example, the texture data 118 can be pre-registered (e.g., by the data capturing device 102) to know, for each point in the 3D data 114 (e.g., and X, Y coordinate) what the corresponding texture is in the texture data 118.

Referring to the computing device 104, the computing device 104 can be, for example, a cell phone, a smart phone, a personal data assistant, a field-programmable gate array, and/or any other device capable of performing the computerized methods described herein. The receiving module 106 receives data 112 from the data capturing device 102. The receiving module 106 can store data 112 in the database 110. In some examples, the receiving module 106 transmits data 112 directly to the processing module 108. In some examples, the processing module 108 retrieves data 112 from the database 110. The processing module 108 generates the compressed 3D data 120. The processing module 108 can store the compressed 3D data 120 in the database 110, can transmit the compressed 3D data 120 to another device (e.g., to a display device, to a device remote from the computing device 104), and/or the like.

Referring to the compressed 3D data 120, the processing module 108 generates the compressed triangle mesh 122, as is further described below. The texture data 124 can be the same texture data 118 from the data 112 (e.g., the computing device 104 maintains the texture data 118 without making changes to it). The compressed 3D data 120 can conform to an industry standard for 3D data. For example, the compressed triangle mesh 122 can be a 3D model stored in an OBJ file, the texture data can be a JPEG file, and the compressed 3D data can include an MPL file mapping the OBJ file to the JPEG file.

The system 100 is an example of a computerized system that is specially configured to perform the computerized methods described herein. However, the system structure and content recited with regard to FIG. 1 are for exemplary purposes only and are not intended to limit other examples to the specific structure shown in FIG. 1. As will be apparent to one of ordinary skill in the art, many variant system structures can be architected without departing from the computerized systems and methods described herein.

In addition, information may flow between the elements, components and subsystems described herein using any technique. Such techniques include, for example, passing the information over the network using standard protocols, such as TCP/IP, passing the information between modules in memory and passing the information by writing to a file, database, or some other non-volatile storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the invention.

Figure 2A:
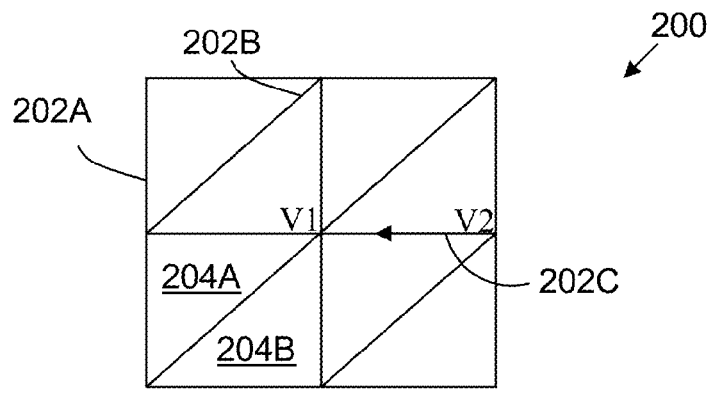
FIG. 2A is an exemplary diagram of a triangle mesh that is being compressed to generate compressed 3D data.
Figure 2B:
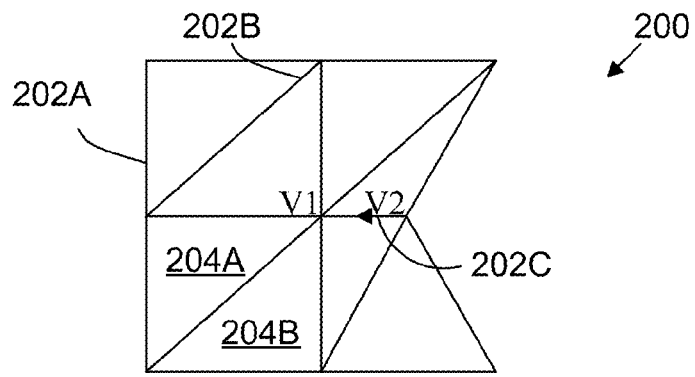
FIG. 2B is an exemplary diagram of a triangle mesh that is being compressed to generate compressed 3D data.
Figure 2C:
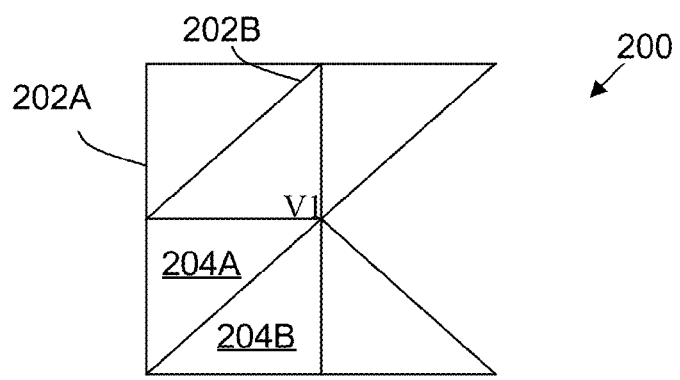
FIG. 2C is an exemplary diagram of a triangle mesh that is being compressed to generate compressed 3D data.

FIGS. 2A-2C are exemplary diagrams of a triangle mesh 200 that is being compressed to generate compressed 3D data. The triangle mesh 200 includes a plurality of edges (e.g., edges 202A, 202B, and 202C collectively referred to as edges 202), a plurality of vertices (e.g., vertices V1 and V2, collectively referred to as vertices V), and a plurality of triangles (e.g., triangles 204A and 204B, collectively referred to as triangles 204). Edge 202C is being collapsed (e.g., by processing module 108). The collapsing process is described in further detail below.

Figure 3:
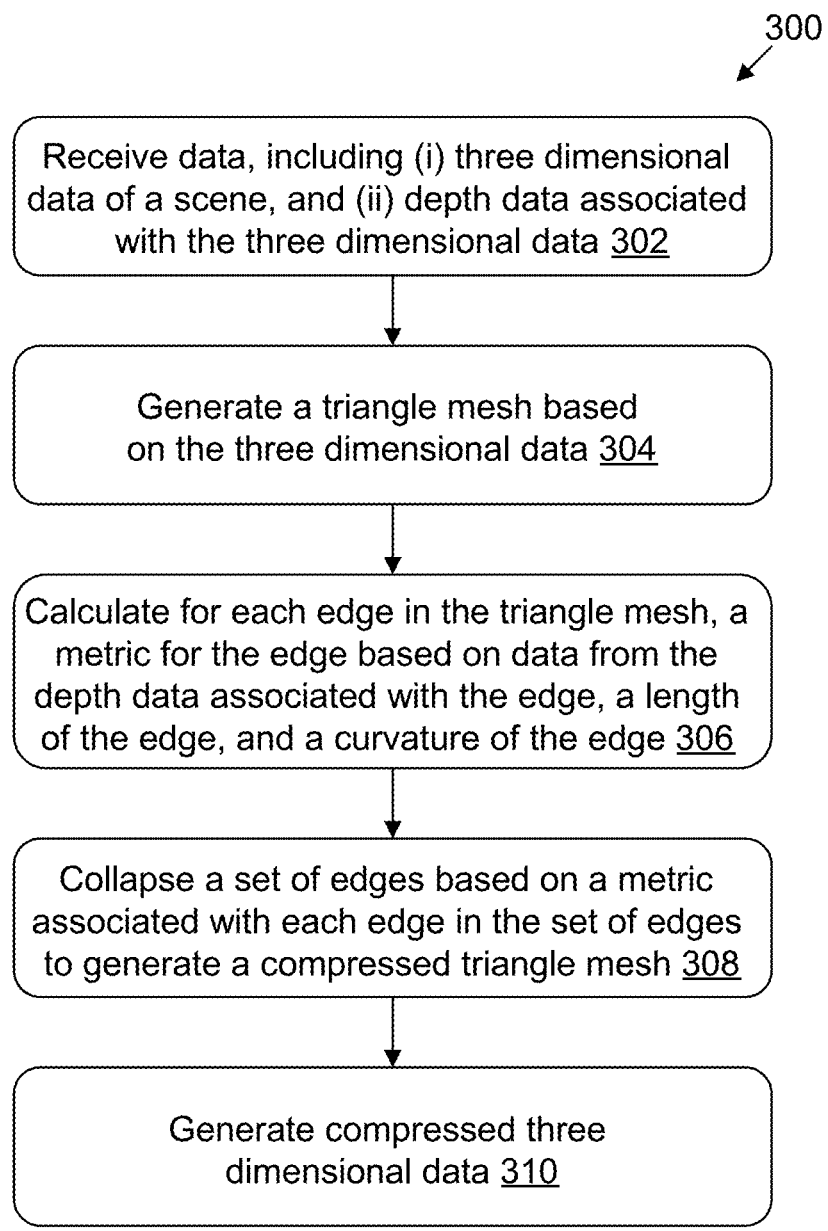
FIG. 3 is a flow diagram of an exemplary method for generating compressed 3D data.

FIG. 3 is a flow diagram of an exemplary method 300 for generating compressed 3D data of a scene. Referring to FIG. 1, at step 302 the receiving module 106 receives data 112 (e.g., from the data capturing device 102) comprising 3D data 114 of a scene and depth data 116 associated with the 3D data 114. At step 304, the processing module 108 generates a triangle mesh (e.g., of which a portion is shown in FIGS. 2A-2C) based on the 3D data 114. Referring to FIG. 2, the triangle mesh includes a plurality of triangles (e.g., triangles 204), each triangle including three vertices (e.g., vertices V) and three edges connecting the three vertices (e.g., edges 202).

At step 306, the processing module 108 calculates, for each edge in the triangle mesh, a metric for the edge based on data from the depth data associated with the edge (e.g., indicating how far the vertices of the edge are from the data capturing device 102), a length of the edge (e.g., the distance between the vertices of the edge), and a curvature of the edge (e.g., the bending of the line that includes the edge). Regarding the curvature, since all the individual edges in the triangle mesh are straight, the curvature for a particular edge can be evaluated by taking neighboring edges into account. If the slopes of an edge's neighboring edges are all the same, then the curvature of the line containing the edges should be small (less bending, and therefore less curvature), otherwise if the slopes are different, then the curvature of the line is large (more bending, and therefore a larger curvature). At step 308, the processing module collapses a set of edges based on a metric associated with each edge in the set of edges to generate the compressed triangle mesh 122. At step 310, the processing module 108 generates the compressed 3D data 120.

Referring to step 304, in some examples the processing module 108 generates the triangle mesh based on depth data 116 associated with the 3D data 114 (e.g., to take into account the location of the data capturing device 102 relative to the captured scene). For example, the triangle mesh can be generated by taking into account whether a triangle in the triangle mesh is facing the data capturing device 102 (e.g., to determine whether a triangle is hidden by other objects in the scene, is angled away from the data capturing device 102, etc.).

In some examples, the processing module 108 generates the triangle mesh based on the 3D data 114 such that objects in the 3D data 114 are not distinguished between (e.g., by using separate triangle meshes). For example, if the data capturing device 102 captures 3D data 114 from a scene that includes a tree and a car, the triangle mesh does not include any data to indicate that the triangle mesh includes 3D data for the tree and the car. Rather, the entire scene is drawn as a single triangle mesh.

Referring to step 306, in some examples calculating a metric for each edge does not require that the processing module 108 calculate a metric for each edge in the triangle mesh. Rather, the processing module 108 can calculate a metric for each vertex in the triangle mesh. For example, the processing module 108 can calculate a metric for each vertex in the triangle mesh based on (i) data from the depth data associated with the vertex, (ii) a length of one or more edges that include the vertex as an end point (e.g., the average of the associated edges), and (iii) a curvature of one or more edges of a line that include the vertex as an end point.

Each edge has two vertices, and the processing module 108 can calculate the metric for the edge based on these vertices. For clarity, edge 202C of FIG. 2A, with vertices V1 and V2, is used in the description below. When collapsing edge 202C (e.g., as described with respect to step 308), the processing module 108 can collapse the edge 202C from V1 to V2 or from V2 to V1. The processing module 108 can calculate a metric for each vertex (e.g., all vertices in the triangle mesh), including V1 and V2. The processing module 108 can use the calculated metrics to determine which neighbor vertex a particular vertex should be collapsed to. For example, the processing module 108 can analyze all neighboring vertices connected to a particular vertex, and collapse the vertex to the neighboring vertex with the lowest metric (e.g., with the lowest cost). For example, referring to edge 202C, the processing module determines V2 collapses to V1 because V1 has the lowest cost of all neighboring vertices to V2. As the result, the cost of edge 202C is the cost of V2.

In some examples the processing module 108 can use Equation 1 to calculate a cost of a vertex $V_1$:

$$\text{Cost}(V_1) = \text{Cost\_Curvature}(V_1) * \text{Cost\_Distance}(V_1) * (1 + A * \text{Cost\_Angle}(V_1)) \quad \text{Equation 1}$$

where:
Cost_Curvature($V_1$)=a curvature metric for $V_1$;
Cost_Distance($V_1$)=a distance metric for $V_1$;
Cost_Angle($V_1$)=an angle metric for $V_1$; and
A=a coefficient between 0 and 1.

Referring to Equation 1, Cost_Curvature($V_1$) can represent a curvature metric for $V_1$ calculated based on neighboring edges (e.g., the slopes of the neighboring edges). For example, the more similar the slopes are of the neighboring edges, the lower the curvature metric, whereas the less similar, the higher the metric.

Cost_Distance($V_1$) can be calculated based on a depth from the depth data 116 associated with $V_1$ (e.g., a distance from the data capturing device 102 and $V_1$). For example, the closer $V_1$ is to the data capturing device 102, the higher the cost for $V_1$. Thus, a cost function can be configured such that a calculated cost is higher for closer vertices (e.g., and therefore more likely to cause noticeable distortion to a viewer if collapsed) and lower for vertices that are further away (e.g., and therefore less likely to cause noticeable distortion to a viewer if collapsed).

Cost_Angle($V_1$) can be calculated based on the angle between normal of $V_1$ and the direction of the data capturing device 102. The normal of vertex $V_1$ can be calculated by averaging the normals to the facets (e.g., the triangle planes) which contain $V_1$. For example, if the normal of a vertex and the camera angle is 180 degrees, the surface containing $V_1$ is facing directly at the camera. In such cases, the metric (or cost) of the vertex is high (and therefore more important). If the normal of the vertex and the camera angle is 90 degrees or less, the surface containing $V_1$ is facing away from the camera—hence, the metric of $V_1$ is low (and therefore less important). In other words, the smaller the angle between the normal line and the line from the data capturing device 102 (e.g., and therefore the more normal the triangle), then the lower the cost of $V_1$. In this example, the lower the cost for Cost_Angle ($V_1$), the less important $V_1$ is (e.g., the less likely V is to cause noticeable distortion to a viewer if collapsed). For example, triangles that are facing away from the camera can be compressed more than triangles facing towards the camera.

Equation 1 is described herein for exemplary purposes only and is not intended to be limiting. One skilled in the art can easily appreciate that there are many different metrics (or cost functions/equations) that can be used instead of Equation 1 without departing from the spirit of the computerized methods described herein. For example, the camera angle is often the same as the viewing angle, but need not be for all cases (the preferred viewing angle could be different from the camera angle). Hence, an image (or scan) can be compressed based on the viewing angle and not just the camera angle. Further, for example, the cost function can be calculated based on just the distance, just the angle, or both. For example, the cost function can be based on just the distance to the camera (or viewing angle) and not the angle component. As another example, instead of cost functions/equations, a database method can be used to generate the compressed 3D data, such as by sorting vertices based on distance.

Referring to step 308, FIGS. 2A-2C illustrate a triangle mesh in which the processing module 108 collapses vertex V2 to vertex V1 to eliminate edge 202C. FIG. 2A shows the triangle mesh 200 before the processing module 108 has begun to collapse V2 to V1. FIG. 2B illustrates the triangle mesh 200 part-way through collapsing V2 to V1. As shown by FIG. 2B, processing module 108 moves V2 towards the location of V1 without moving the location of V1. FIG. 2B is used to illustrate the collapsing process, but need not be carried out in the actual collapsing process. For example, each edge that includes V2 can be substituted to include V1 without performing a "moving" process as shown in FIG. 2B (e.g., by updating the edge data to include V1 in place of V2). FIG. 2C shows the final result of collapsing V2 to V1, where V2 is removed and all edges that originally included V2 now include V1. For example, the formula to collapse 202C can be: (1) remove any triangle that has V1 and V2 as vertices, (2) update the remaining triangles that use V2 to instead use V1, and (3) remove vertex V2.

Referring further to step 308, the processing module 108 can calculate the set of edges to collapse based on, for example, a desired compression ratio, a metric associated with each edge in the set of edges, and/or the like. For example, the processing module 108 can determine a certain number of edges to collapse in order to achieve a desired compression (e.g., 80%, 90%, etc.). The processing module 108 can determine which edges to include to achieve the desired compression based on the metric (e.g., the edges with a highest metric, the edges with a lowest metric, and/or the like).

FIG. 4 is an exemplary table 400 for generating compressed 3D data. Table 400 includes vertex column 402 (which lists vertices that can be collapsed), collapsing candidate column 404 (which lists the vertex to which the vertex listed in 402 can be collapsed to), and metric value 406 (which lists the calculated metric value for the vertex in column 402). The vertices can be collapsed as described above with reference to FIGS. 2A-C. The rows of table 400 are sorted based on the metric value 406 from the highest metric value to the lowest metric value. Table 200 includes 9 entries, and therefore the triangle mesh represented by table 200 includes nine vertices, vertices V0-V8.

As an example, the processing module 108 is configured to compress the triangle mesh down to only have 4 vertices. The processing module 108 can keep the four vertices with larger costs in the mesh (which are V8, V5, V0 and V2). Therefore, the processing module 108 collapses vertices V6, V3, V1, V7 and V4. The processing module collapses each selected edge to the vertex listed in the collapsing candidate 404 column. For example, the processing module 108 collapses V6 to V1. Because V1 is not in V8, V5, V0 and V2 (the vertices to maintain), the processing module 108 collapses V1 to V7 and V7 to V2. As the result, V6, V1 and V7 are collapsed to V2, and the processing module 108 moves on to the next vertex to collapse since V2 is a vertex that is to be maintained. The processing module 108 continues by collapsing V3 to V8, and does not collapse V8 because V8 does not have any candidate vertexes to collapse to (as indicated by "Null" in the collapsing candidate column 404). The processing module 108 collapses V4 to V0, and stops at V0 because V0 is a vertex to maintain. The final result is that all of the vertices are collapsed to leave only V8, V5, V0 and V2.

The processing module 108 can compress the mesh to achieve a desired compression ratio, while being able to revert back to the original uncompressed mesh since no additional vertices are added to the triangle mesh. By not adding new vertices, the original relationship between the 3D data 114 and the texture data 118 is maintained. In some examples, the processing module 108 generates the compressed 3D data 120 without preserving the relationship between the 3D data 114 and the texture data 118.

Referring to step 310 and FIG. 1, the received data 112 includes the texture data 118 associated with the 3D data 114. The processing module 108 can generate the compressed 3D data 120 such that it includes the compressed triangle mesh 122 (e.g., as described above with respect to step 308) and the texture data 124 without modifying the originally received texture data 118 (e.g., the texture data is not modified in order to achieve the compression).

Figure 5A:
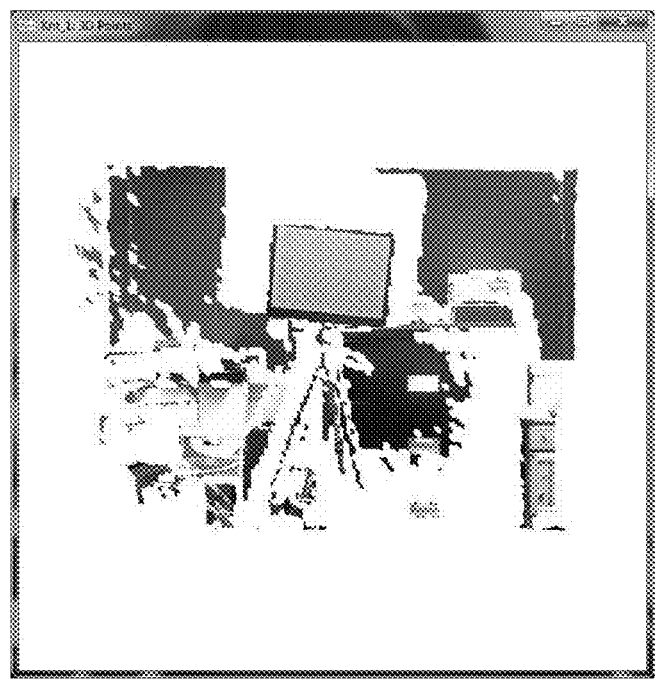
FIG. 5A is an image showing an original triangle mesh, without three dimensional compression, and texture.
Figure 5B:
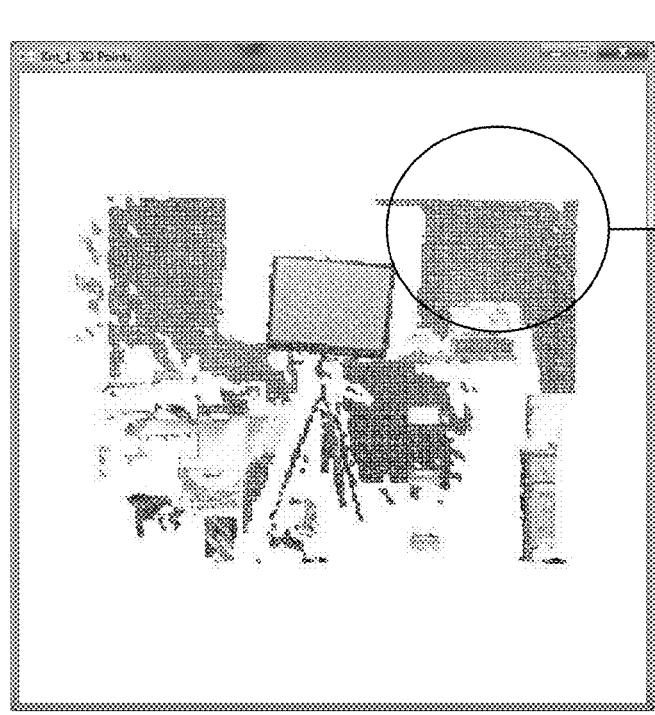
FIG. 5B is an image showing an original triangle mesh, without three dimensional compression, and without texture.
Figure 6A:
FIG. 6A is an image showing a compressed triangle mesh and texture.
Figure 6B:
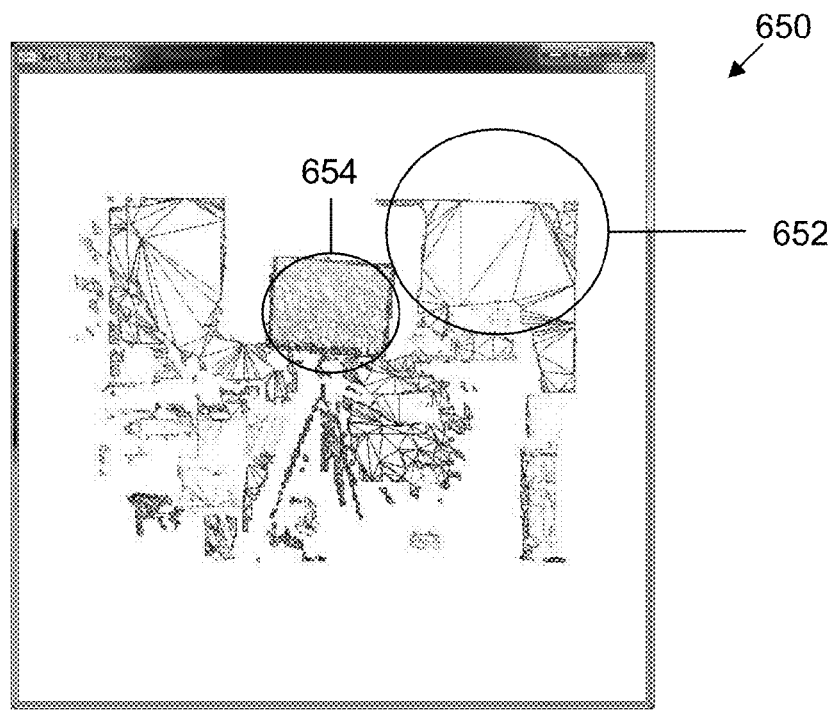
FIG. 6B is an image showing a compressed triangle mesh without texture.

FIG. 5A is an image 500 showing an original triangle mesh, without three dimensional compression, and texture data. For example, FIG. 5A is the image normally achieved by 3D systems without performing any compression. FIG. 5B is an image 550 showing an original triangle mesh, without three dimensional compression, and without texture data. FIG. 6A is an image 600 showing a compressed triangle mesh (e.g., compressed triangle mesh 122 as generated using method 300) and texture data. FIG. 6B is an image 650 showing a compressed triangle mesh without texture. As can be seen by comparing image 500 to image 600, there is little, if any, discernable difference between the scenes in figures 500 and 600. However, comparing image 550 to image 650, such as portion 552 in image 550 and portion 652 in image 650, image 550 includes a significantly higher number of triangles than image 650. Additionally, image 650 includes portions further away from the viewer (e.g., that in portion 652) that are compressed more (e.g., and therefore have less triangles) than portions closer to the viewer (e.g., that in portion 654).

By compressing the compressed triangle mesh 122 (e.g., as represented by an OBJ file), the size of such files can be drastically reduced (e.g., and therefore much smaller than a usual size of 10-20 Mb). The compressed 3D data 120 can therefore be saved easier (e.g., by mobile devices, personal data accessories, multipurpose devices, and other devices that may not have as much memory), transmitted easier, and/or both. Additionally, devices can process the compressed 3D data easier (e.g., since there are less points in the compressed triangle mesh 122 to process).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method for compressing three dimensional data of a scene, comprising:
   receiving, by a computing device, data comprising (i) three dimensional data of a scene, and (ii) depth data associated with the three dimensional data;
   generating, by the computing device, a triangle mesh based on the three dimensional data, the triangle mesh comprising a plurality of triangles, each triangle including three vertices and three edges connecting the three vertices;
   calculating, by the computing device, for each edge in the triangle mesh, a metric for the edge based on data from the depth data associated with the edge, a length of the edge, and a curvature of the edge; and
   collapsing, by the computing device, a set of edges based on a metric associated with each edge in the set of edges to generate a compressed triangle mesh.

2. The method of claim 1, wherein the received data comprises (iii) texture data associated with the three dimensional data, the method further comprising:
   generating compressed three dimensional data comprising the compressed triangle mesh and the texture data, wherein the texture data is not modified.

3. The method of claim 1, wherein generating the triangle mesh comprises generating the triangle mesh based on the depth data associated with the three dimensional data.

4. The method of claim 1, wherein collapsing an edge from the set of edges, the edge including a first vertex and a second vertex, comprises:
   moving the first vertex to a same location as a location of the second vertex, such that the edge is removed from the triangle mesh.

5. The method of claim 4, wherein a first set of edges include the first vertex as an vertex, and collapsing comprises adjusting the first set of edges to include the second vertex instead of the first vertex.

6. The method of claim 1, wherein generating the triangle mesh comprises generating the triangle mesh based on the three dimensional data such that objects in the three dimensional data are not distinguished among using separate triangle meshes.

7. The method of claim 1, wherein calculating a metric for an edge comprises calculating a metric for a vertex based on:
   a curvature metric calculated based on neighboring edges that include the vertex;
   a distance metric calculated based on a depth from the depth data associated with the vertex; and
   an angle metric calculated based on an angle between a normal of the vertex and a direction of a data capturing device that captured the data, wherein the normal is calculated by averaging a normal for each facet in a set of facets in the triangle mesh that contain the vertex.

8. The method of claim 1, wherein calculating, for each edge in the triangle mesh, a metric for the edge comprises calculating a metric for each vertex in the triangle mesh based on:
   data from the depth data associated with the vertex;
   a length of one or more edges that include the vertex as an end point; and
   a curvature of one or more edges of a line that include the vertex as an end point.

9. The method of claim 1, further comprising calculating the set of edges to collapse based on:
   a desired compression ratio; and
   a metric associated with each edge in the set of edges.

10. A computer program product, tangibly embodied in a non-transitory computer readable medium, for compressing three dimensional data of a scene, the computer program product including instructions that, when executed by a processor of a data processing apparatus, cause the data processing apparatus to:
   receive data comprising (i) three dimensional data of a scene, and (ii) depth data associated with the three dimensional data;
   generate a triangle mesh based on the three dimensional data, the triangle mesh comprising a plurality of triangles, each triangle including three vertices and three edges connecting the three vertices;
   calculate for each edge in the triangle mesh, a metric for the edge based on data from the depth data associated with the edge, a length of the edge, and a curvature of the edge; and
   collapse a set of edges based on a metric associated with each edge in the set of edges to generate a compressed triangle mesh.

11. A computing device for compressing three dimensional data of a scene, comprising:
   a receiving module configured to receive data comprising (i) three dimensional data of a scene, and (ii) depth data associated with the three dimensional data; and
   a processing module in communication with the receiving module configured to: generate a triangle mesh based on the three dimensional data, the triangle mesh comprising a plurality of triangles, each triangle including three vertices and three edges connecting the three vertices;
   calculate for each edge in the triangle mesh, a metric for the edge based on data from the depth data associated with the edge, a length of the edge, and a curvature of the edge; and
   collapse a set of edges based on a metric associated with each edge in the set of edges to generate a compressed triangle mesh.

12. The computing device of claim 11, wherein the computing device comprises a cell phone, a smart phone, a personal data assistant, a field-programmable gate array, or any combination thereof.

13. An apparatus for compressing three dimensional data of a scene, the apparatus comprising:
   a means for receiving data comprising (i) three dimensional data of a scene, and (ii) depth data associated with the three dimensional data; and
   a means for:
      generating a triangle mesh based on the three dimensional data, the triangle mesh comprising a plurality of triangles, each triangle including three vertices and three edges connecting the three vertices;
      calculating for each edge in the triangle mesh, a metric for the edge based on data from the depth data associated with the edge, a length of the edge, and a curvature of the edge; and
      collapsing a set of edges based on a metric associated with each edge in the set of edges to generate a compressed triangle mesh.

* * * * *